(12) United States Patent
Lauterbach et al.

(10) Patent No.: US 12,115,828 B2
(45) Date of Patent: Oct. 15, 2024

(54) CASING CONFIGURATION FOR MPE AXLE SET

(71) Applicant: RAPA Automotive GmbH & Co. KG, Selb (DE)

(72) Inventors: Frank Lauterbach, Selb (DE); Alexandra Maier, Selb (DE); Christian Schrems, Selb (DE); Maximilian Bähr, Selb (DE); Marco Wolfrum, Selb (DE)

(73) Assignee: RAPA AUTOMOTIVE GMBH & CO. KG, Selb (DE)

( * ) Notice: Subject to any disclaimer, the term of this patent is extended or adjusted under 35 U.S.C. 154(b) by 0 days.

(21) Appl. No.: 17/679,600

(22) Filed: Feb. 24, 2022

(65) Prior Publication Data

US 2022/0281281 A1 Sep. 8, 2022

(30) Foreign Application Priority Data

Mar. 2, 2021 (DE) ............... 10 2021 105 032.4

(51) Int. Cl.
| | |
|---|---|
| *F15B 15/18* | (2006.01) |
| *B60G 17/015* | (2006.01) |
| *B60G 17/08* | (2006.01) |
| *B60G 13/08* | (2006.01) |

(52) U.S. Cl.
CPC ......... *B60G 17/08* (2013.01); *B60G 17/0152* (2013.01); *F15B 15/18* (2013.01); *B60G 13/08* (2013.01); *B60G 2202/24* (2013.01); *B60G 2204/62* (2013.01); *B60G 2500/104* (2013.01); *B60G 2800/162* (2013.01)

(58) Field of Classification Search
CPC .... B60G 17/08; B60G 17/0152; B60G 13/08; B60G 2204/24; B60G 2204/62; B60G 2202/413; B60G 2202/416; B60G 2204/20; B60G 17/015; F15B 15/18; F04C 13/00; F04B 17/03; F04B 53/16; F04B 23/04; H02K 5/04
See application file for complete search history.

(56) References Cited

U.S. PATENT DOCUMENTS

| | | | | |
|---|---|---|---|---|
| 2019/0242340 | A1* | 8/2019 | Becker | ............. H02K 5/04 |
| 2019/0252953 | A1* | 8/2019 | Tsuboi | ............. H02K 5/10 |
| 2022/0260073 | A1* | 8/2022 | Blendea | ............ B60N 2/914 |

FOREIGN PATENT DOCUMENTS

| | | | | |
|---|---|---|---|---|
| CN | 111953126 | A * | 11/2020 | ......... B62D 5/0406 |
| CN | 217415733 | U * | 9/2022 | ......... B60T 13/148 |
| DE | 2020292 | A1 | 11/1971 | |
| DE | 3902743 | C1 | 7/1990 | |

(Continued)

OTHER PUBLICATIONS

Description Translation for EP 3,764,522 from Espacenet (Year: 2021).*

(Continued)

*Primary Examiner* — Jason D Shanske
*Assistant Examiner* — Daniel M. Keck
(74) *Attorney, Agent, or Firm* — Maier & Maier, PLLC (57) ABSTRACT

An apparatus for supplying hydraulic energy in a chassis system of a vehicle including at least three construction groups, which are arranged in an overall casing constructed of at least three partial casings. The three partial casings respectively adjoin each other and are closed there with a sealing adhesive.

20 Claims, 4 Drawing Sheets

(56) References Cited

FOREIGN PATENT DOCUMENTS

| | | | |
|---|---|---|---|
| DE | 102012207236 A1 * | 3/2013 | |
| DE | 102012204526 A1 | 7/2013 | |
| DE | 102014103958 A1 | 9/2015 | |
| DE | 102014103959 A1 | 9/2015 | |
| DE | 102016214115 A1 | 2/2018 | |
| DE | 102019111980 A1 | 11/2020 | |
| DE | 102019118384 A1 | 1/2021 | |
| EP | 3184819 B1 | 3/2019 | |
| EP | 3736146 A1 | 11/2020 | |
| EP | 3764522 A1 | 1/2021 | |
| FR | 3100092 A1 * | 2/2021 | ............ H02K 11/30 |
| JP | 6901018 B1 * | 7/2021 | |

OTHER PUBLICATIONS

Description Translation for DE 102012/204526 from Espacenet (Year: 2013).*
Description Translation for JP 6,901,018 from Espacenet (Year: 2021).*
Extended European Search Report issued on Jul. 4, 2022, in connection with corresponding European Application No. 22159360.1 (18 pp., including partial machine-generated English translation).
First Office Action issued Oct. 14, 2021, in corresponding to German Application No. 102021105032.4; 5 pages.

* cited by examiner

CASING CONFIGURATION FOR MPE AXLE SET

FIELD

The present invention relates to an apparatus for supplying hydraulic energy in an active chassis of a vehicle, a chassis axle and a chassis system with such an apparatus.

BACKGROUND

Active chassis systems are known in principle, for example from DE 39 02 743 C1 or DE 2 020 292 A1. An active chassis has hydraulically actuatable shock absorbers, in which the two cylinder or shock absorber chambers of the working cylinder of a given shock absorber are not merely interconnected via one or several, possibly actuatable damping or throttle valves, but in which the filling state of the cylinder chambers can be actuated actively and correspondingly hydraulic forces can be channeled as needed into the chassis. The two cylinder chambers of a shock absorber can be interconnected, for example, via a hydraulic pump.

Thus, by pumping hydraulic fluid pitching and/or rolling movements of the vehicle, for example, can be counteracted. Conversely, such an arrangement of shock absorber, hydraulic pump and electric motor can in principle also be utilized to feed electric energy obtained by recuperation back into the on-board network of the vehicle. Further, when employing the pump, different damping behaviors can be set, for example "soft" or "hard" or also in dependence on the driving behavior and/or the subsurface conditions.

For actuating the electric motor of a given hydraulic pump usually a corresponding control unit is provided, whereby a so-called motor-pump unit is created, having a pump, an electric motor and a control unit (ECU, electric control unit) and often being formed as a constructional unit. It is known to provide exactly one motor-pump unit (MPU) for each shock absorber to be actuated. The corresponding motor-pump unit can be mounted immediately on or at least near the respective shock absorber. For reasons of construction space, however, this is not always possible, so that the corresponding motor-pump unit possibly must be placed at a distance from the shock absorber in the vehicle. The correct connection of the hydraulic lines and of the electric lines must be taken into account here.

From EP 3 736 146 A1 and EP 3 764 522 A1 also so-called MPU axle sets are known, each of which comprising, as a pre-mounted constructional unit, two pumps and two electric motors or two motor-pump groups, in which one pump and one electric motor form a constructional unit in each case, each of which are then allocated to one of the two shock absorbers of a vehicle axle. The two shock absorbers are actuated or driven independently from each other therein.

SUMMARY

Such axle sets are arranged, for example, in a closed, sealed overall casing, which is sealed against soling and other environmental influences on the one hand, for example airtight, waterproof or splash-waterproof, with the axle set thus being installable on a lower side of a vehicle. On the other hand, the overall casing should also be sealed or shielded against electromagnetic radiation, which is generated, for example, due to high alternating currents in the axle set, in order to minimize or reduce the EMC exposure. However, this often results in limitations with respect to the configuration of the casing parts of the overall casing, leading to poor accessibility of construction groups installed in the partial casings and to more complicated mounting.

It is the object of the invention to create an apparatus for supplying hydraulic energy in an active chassis system of a vehicle, the partial casing of which ensures at the same time a great tightness of the overall casing and good accessibility of the construction groups installed therein. Further, it is the object of the present invention to state a corresponding chassis axle and a corresponding chassis system.

This object is achieved by an apparatus having the features of the independent claims. Advantageous embodiments and developments are stated in the claims dependent thereon.

An apparatus according to the invention for supplying hydraulic energy in a chassis system of a vehicle comprises at least the following three construction groups or consists exactly thereof:
 a first motor-pump group, comprising or consisting of a first hydraulic pump and a first electric motor for driving the first hydraulic pump,
 a second motor-pump group, comprising or consisting of a second hydraulic pump and a second electric motor for driving the second hydraulic pump, and
 at least or exactly one electronic unit for electrically controlling and driving the first and the second motor-pump group.

The first and the second motor-pump group (possibly all motor-pump groups) are preferably identically constructed or identical and/or configured to be mirror-symmetrical. The apparatus according to the invention is hereinafter also referred to as axle set, however, which is not to be understood in a limiting manner.

In the mounted or operation-ready state of the apparatus or the axle set according to the invention, the at least three or all construction groups, thus at least the two motor-pump groups and the electronic unit, are arranged completely within, i.e. in the interior space or on the inside of a common, closed and sealed overall casing.

This overall casing is formed from a multiplicity of partial casings, at least from three partial casings. It is closed or created by joining this multiplicity of partial casings, thereby creating a closed (completely self-contained) interior space of the overall casing, which is then sealed. Correspondingly, in the mounted state of the axle set, i.e. in the closed overall casing, all partial casings are joined and preferably all partial casings are respectively mutually immediately interconnected permanently. The partial casings preferably serve as carriers for exactly one or also several construction groups. In the simplest case, each construction group is arranged and/or installed permanently in or on exactly one partial casing, and in particular is embedded in such a manner that the respective construction group is arranged completely or substantially in an interior space spanned by the partial casing. Further, in the simplest case the overall casing consists of exactly (these) three partial casings.

Therein, the at least three respectively mutually adjoining partial casings or all partial casings preferably each have a completely integral outer area (meaning that the outwardly disposed area of a given partial casing continuously consists of the same material) or have an at least single-piece outer area (meaning that several partial casing sections, which form the outwardly disposed area, are not separated or divided and/or are permanently and tightly or inseparably interconnected when the partial casing in question is employed or handled properly). The partial casings thus have a completely and continuously closed and sealed outer area.

In the simplest case, the outer area of a partial casing is identical to its exterior side. However, one or several recesses or apertures can be provided in the outer area of the partial casings, for example as guideways for lines and cables or as screw holes, which are then sealed and/or possibly closed with a lid and/or are arranged exclusively at a distance from the boundary, for example, so that—also in the case of possibly given guideways—there results a completely closed and sealed exterior side of the respective partial casing. When such a recess or aperture is arranged on a boundary of the outer area of the partial casing (for example at one of the casing separation lines described below), is it sealed and/or closed in interaction with an immediately adjoining partial casing, i.e. in the overall casing. The exterior side of the partial casings after the joining of the partial casings or the forming of the closed overall casing at the same time forms the exterior side or the respective part of the exterior side of the overall casing.

According to the invention, exactly three or at least three partial casings of the multiplicity of partial casings in the overall casing are formed to be respectively mutually adjoining, so that these three partial casings immediately adjoin each other at least in one point on the exterior side of the overall casing, in the simplest case immediately abut on each other. This at least one point is hereinafter referred to as branching-off point, since the lines on the exterior side of the overall casing, along which these at least three partial casings adjoin each other (hereinafter referred to as casing separation lines), coincide in such a branching-off point or branch off there, preferably at a right angle, which is then also referred to as a T-joint. Preferably, on the (all) branching-off points no sealing component is provided that differs from the partial casings adjoining each other there, in particular no further component, and preferably exactly three partial casings adjoin or abut on each other there. Also in view of the presence of such branching-off points, the casing separation lines between the at least three respectively mutually adjoining partial casings form closed paths or trajectories on the overall casing, so that on the exterior side of the overall casing there is as a rule an even number of branching-off points present, for example exactly two, four, etc. branching-off points.

Such an arrangement of partial casings, which serve as carriers of the construction groups, for example, creates greater degrees of freedom with respect to their geometrical configuration, in particular in view of the configuration of their exterior sides and/or their openings to the interior space of the overall casing. These can then be formed as a large, continuously region, thereby increasing the resulting accessibility to the installed construction groups.

However, predominantly due to the branching-off points, the casing separation lines created by the at least three respectively mutually adjoining partial casings can hardly be sealed reliably—at least by machine—with the aid of pre-shaped, self-supporting and/or possibly elastomeric seals (hereinafter referred to as component seals) to be inserted (at the casing separation lines). Therefore, according to the invention, at least or exactly the casing separation lines disposed between the at least three respectively mutually adjoining partial casings are closed with a sealing adhesive or sealing material preferably completely and exclusively, thus sealing the construction groups against environmental influences (such as dirt, water, salt water, splash water, etc.) in an airtight, waterproof and/or splash-waterproof manner.

The sealing adhesive here is provided or applied continuously or without interruptions along the complete casing separation lines disposed between the at least three respectively mutually adjoining partial casings. This has the advantage that the at least three respectively mutually adjoining partial casings permitting greater accessibility can be sealed reliably by machine. Moreover, the sealing adhesive can simply be cut open in the case of repair or maintenance and re-applied—also by machine—during the subsequent joining of the partial casings to form the overall casing. Correspondingly, component seals can be omitted. In other words, preferably at least or exactly or only the casing separation lines disposed between the at least three respectively mutually adjoining partial casings are sealed with a sealing adhesive.

The sealing adhesive, which is liquid or viscous when applied, is preferably permanently elastic, meaning that it remains deformable or elastic also after drying or curing (for example by UV radiation). Preferably, the sealing adhesive is resistant at least in a temperature range of $-50°$ C. to $100°$ C. or employable as a sealing means for the purposes of an axle set. As the sealing adhesive, for example a material on the basis of silicone, such as Sikasil AS-785 from the company SIKA, is employed (Sikasil AS-785 A+B—Product Data Sheet Version 3 (01/2014)).

As already mentioned, the overall casing in the simplest case consists of exactly three partial casings that respectively abut on each other then. On one, several or all or exactly or the at least three respectively mutually adjoining partial casings, however, there can also be arranged one or several further partial casings directly or indirectly, for example all or only part of which are then attached in a sealing manner to the respective partial casing without sealing adhesive, for example flange-mounted via a planar and/or circular flange and/or while employing an insertable and/or self-supporting component seal, for example an elastomeric component, such as an O-ring. One example for further partial casings of this kind is, for example, the pump lids described in the embodiment examples.

The apparatus according to the invention serves for supplying hydraulic energy in a chassis system, for example in shock absorbers. It is preferably provided there in that such actuators are directly and immediately hydraulically driven by the pumps, that that, particularly preferably, the position of the actuators is determined exclusively by the pump. For example, an actuator is constituted by two pressure chambers separated by a working piston, which are then connected (exclusively) via the pump. There results a closed hydraulic system, in particular without a pressureless tank, in which there correspondingly exists a fixed relation between the position of the pump and the position of the actuator.

The overall casing preferably has a cuboid or substantially cuboid outer area or outer shape. Further, the casing separation lines, on which the at least three respectively mutually adjoining partial casings adjoin or abut on each other, preferably do not extend along edges (such as convex outer edges) of the overall casing and do not form an outer edge—not even in some sections. These casing separation lines correspondingly intersect all outer edges of the overall casing at an angle that is different from zero, for example at at least 30, 45 or 60 degrees, preferably at 90 degrees, i.e. perpendicularly. This is favorable for the sealing and the durability of the sealing adhesive.

The at least three respectively mutually adjoining partial casings have corresponding engagement regions, preferably abutment edges, on which and/or along which these at least three respectively mutually adjoining partial casings, preferably continuously or without interruption, are mechanically engaged with each other, preferably in a direct, immediate mechanical contact. These engagement regions or abutment edges then form the casing separation lines in the closed overall casing.

These (elongated) engagement regions extend, preferably continuously, i.e. without interruption, near the boundary and/or form the boundary of the respective partial casing and/or form a closed path or a closed trajectory in or on the partial casing. The engagement regions correspondingly form separation lines, which, in the overall casing and/or on the respective partial casings, separate the casing inside from the casing exterior side or the interior space from the exterior space.

The engagement regions are preferably formed as abutment areas or abutment edges which are disposed opposite each other in the closed overall casing and abut on each other continuously. Preferably, the abutment edges are the distal or boundary-side front areas or front edges of the respective partial casing (distal abutment edges) that face away from the respective partial casing. They are preferably not chamfered and form, for example, a right angle with the surface of the partial casing inside and/or exterior side adjoining or ending at the abutment edge.

In the simplest case the corresponding engagement regions of all mutually engaged partial casings are continuously formed as such distal abutment edges, so that the respectively mutually adjoining partial casings do not overlap or are not interlaced in another manner in the engagement regions. Correspondingly, in this case the front edges of the adjoining partial casings are disposed in a continuously butt-joined or mutually contacting manner along the intermediate casing separation line, so that the front sides form continuous contact areas or abutment edges on the boundary of the partial casings.

Alternatively, the engagement regions of mutually adjoining partial casings can overlap continuously or in sections, for example as laps and tongues.

Further, the engagement regions or abutment edges are preferably formed to be smooth, planar and/or straight at least in the longitudinal direction, as a rule along/in the direction of the casing boundary, so that when the at least three respectively mutually adjoining partial casings are joined, adjoining partial casings are displaceable relative to one another and can be oriented, preferably along or by sliding on the engagement regions or distal abutment edges. Preferably, in a given partial casing of the at least three respectively mutually adjoining partial casings, all engagement regions or abutment edges of the partial casing which adjoin exactly one given further partial casing of the at least three respectively mutually adjoining partial casings are disposed in exactly one plane (which is referred to below also as sectional plane).

Preferably, all corresponding engagement regions or abutment edges of the at least three respectively mutually adjoining partial casings are formed continuously as described above.

In the at least three respectively mutually adjoining partial casings respectively all corresponding engagement regions or abutment edges of a given partial casing are disposed in exactly one plane or in exactly two or exactly three planes. Correspondingly, also all casing separation lines are disposed in these planes, so that they represent sectional planes for the closed overall casing. These planes or sectional planes therein intersect (preferably at the boundary of the respective partial casing) and are respectively disposed perpendicularly to each other preferably at the sectional lines at which they intersect. In the case of, for example, exactly two such sectional planes, thus in the partial casing there result two adjacent sides of the partial casing which are passable or completely open towards the interior space (both of the overall casing and of the partial casing). Particularly at the sectional line of these two sectional planes, this results in a good or easy accessibility to the interior space of the partial casing.

Preferably, the partial casings or each partial casing have/has exactly one (continuous) outer area, which extends continuously, for example via various adjacent sides of the respective partial casing. Correspondingly, the outer area of a partial casing is preferably not divided or separated into two or more area sections by engagement regions or abutment edges. In this case, all engagement regions or abutment edges of a given partial casing of the at least three respectively mutually adjoining partial casings form exactly one closed path or one closed trajectory that extends in exactly one or in several planes or sectional planes.

Preferably, as already mentioned, the at least three respectively mutually adjoining partial casings or all partial casings of the apparatus according to the invention have an integral or single-piece and/or sealed or closed outer area or exterior side. Correspondingly, the exterior side or outer area of the individual partial casings is sealed against or impermeable to soiling and other environmental influences and is in particular airtight, waterproof and/or splash-waterproof or impermeable thereto. In particular, corresponding engagement regions or abutment edges of the at least three respectively mutually adjoining partial casings are preferably continuously formed of one material, i.e. continuously integrally and thus without material transition.

Further, preferably the at least three respectively mutually adjoining partial casings or all partial casings of the apparatus according to the invention are configured to be electroconductive and comprise one or several electroconductive materials or consist (completely) thereof. The electroconductive material therein is preferably a metal alloy, a metal, aluminum, cast aluminum or die-cast aluminum. Advantageously, in the overall casing the borders or transitions between the at least three respectively mutually adjoining partial casings, preferably between all partial casings, which (immediately) engage with each other and which are preferably formed as abutment edges, are formed continuously in electroconductive manner, so that there results a continuously electroconductive overall casing or a complete and/or gapless (electromagnetic) shielding for the construction groups arranged in the interior space of the overall casing. Thus, varying EMC requirements can be fulfilled easily. With respect to this, the closed overall casing preferably fulfills the internationally applicable standard CISPR 25 (Edition 4.0 2016-10) and/or the publicly accessible standard provision of VW TL 81000 on the EMC of motor vehicle components (version: 2018-03).

In a preferred embodiment, the first motor-pump group is arranged in a first partial casing of the at least three respectively mutually adjoining partial casings, the so-called first motor-pump casing. A drive shaft of the first electric motor, for driving the first pump preferably arranged spaced apart there from, i.e. a drive shaft having a length different from zero, defines a longitudinal axis of the first motor-pump group and of the first partial casing or the first motor-pump casing. The first motor-pump casing or its exterior side, which preferably spans a cuboid interior space, preferably has a U-shaped or substantially U-shaped cross section transversally or perpendicularly to the drive shaft or to the longitudinal axis and/or surrounds the first motor-pump group on at least or exactly three sides continuously or with a closed area. The engagement regions of the first motor-pump casing extend preferably in exactly two planes or sectional planes disposed perpendicularly to each other. Likewise, preferably also the second motor-pump group is arranged in a second partial casing of the at least three respectively mutually adjoining partial casings, the so-called second motor-pump casing, and a drive shaft of the second electric motor for driving the second pump defines a longitudinal axis of the second motor-pump group and of the second partial casing or the second motor-pump casing, wherein the second motor-pump casing or its exterior side, which preferably spans a cuboid interior space, has a U-shaped or substantially U-shaped cross section transversally or perpendicularly to the drive shaft or the longitudinal axis and/or surrounds the second motor-pump group on at least or exactly three sides continuously and/or wherein the engagement regions of the second motor-pump casing extend in exactly two planes or sectional planes disposed perpendicularly to each other.

In the simplest case, the motor-pump groups are arranged completely within an interior space spanned by the respective motor-pump casing. However, independently of the engagement regions of the motor-pump casings and/or spaced apart therefrom, there can also be arranged several further partial casings on the motor-pump casings, for example pump lids, so that the motor-pump group is arranged preferably completely within the interior space resulting from the motor-pump casing and the pump lid.

The pump lids are likewise preferably arranged on the longitudinal axis of the motor-pump casing or the motor-pump group and the motor-pump casing has on the longitudinal axis, preferably on a front side or transverse plane of the partial casing, a, for example, circular opening with a planar boundary arranged preferably in a plane transversal to the longitudinal axis, over which edge the pump projects completely or partly beyond the motor-pump casing and is covered and tightly sealed by the at least one pump lid.

With the preferably U-shaped cross section of the motor-pump casing perpendicular to the longitudinal/drive axis, the motor-pump casing surrounds the first motor-pump group preferably on at least or exactly three longitudinal sides with a closed area, particularly preferably along the complete or substantially along the complete length of the motor-pump group.

Conversely, the engagement regions or abutment edges of the respective motor-pump casing preferably extend in exactly two planes disposed perpendicularly to each other, namely a longitudinal plane and a transversal plane. The longitudinal plane extends in parallel to the drive shaft or the longitudinal axis, so that engagement regions of this longitudinal plane in a cuboid motor-pump casing form a U-shaped opening on the longitudinal side of the motor-pump casing. The transverse plane extends perpendicularly to the drive shaft or the longitudinal axis, so that engagement regions of this transverse plane in a cuboid motor-pump casing likewise form a U-shaped opening on the front side of the motor-pump casing facing away from the pump. The engagement regions of the longitudinal or the transverse plane are provided and adapted for engagement on the third or second partial casing or vice versa. Correspondingly the motor-pump casing in the unmounted state is open there, allowing good accessibility to the motor-pump group installed in the motor-pump casing, in particular to the section facing away from the pump, as a rule the back side of the electric motor. The motor-pump casing therefore preferably serves at the same time as a carrier for the motor-pump group.

The first and the second motor-pump casing and also the first and the second motor-pump group are preferably configured to be respectively identically constructed.

In a further preferred embodiment, the electronic unit is arranged in a third partial casing, the so-called electronic casing or electronic lid, of the at least three respectively mutually adjoining partial casings and therein preferably completely within the interior space spanned by the electronic casing.

The electronic casing preferably spans a cuboid interior space and/or has a cuboid outer shape and particularly preferably has a U-shaped cross section perpendicular to two of the three cube axes. Correspondingly, the electronic casing surrounds the electronic unit on five sides of the total of six cube sides with a closed area. In other words, the electronic casing is formed concavely or in a dish shape, wherein preferably the larger side of the cube forms the (only) opening to the interior space of the overall casing. Correspondingly, all engagement regions of the electronic casing are disposed in exactly one single plane, wherein preferably all other of the at least three respectively mutually adjoining partial casings are arranged next to one another there.

Preferably a depression or an outer groove for receiving the sealing adhesive is provided, preferably continuously, along or on or above the casing separation lines of the at least three respectively mutually adjoining partial casings on the exterior side of the overall casing. Correspondingly, the at least three respectively mutually adjoining partial casings, on the corresponding engagement regions or abutment edges, in the simplest case towards the boundaries of the partial casings, have respectively (continuously) one tapering of the wall thickness (on the boundary side) or a recess on the exterior side, which then create this outer groove in the overall casing. In the simplest case, the taperings or recesses each have half the width of the outer groove on the overall casing. Such an outer groove facilitates the sealing of the casing separation lines of the at least three respectively mutually adjoining partial casings in the overall casing, avoids projections of the sealing adhesive on the exterior side of the overall casing and thus prevents unintentional damage to the sealing adhesive.

The width of the outer groove is preferably in the range between 1 and 10 mm and amounts to 1, 2, 3, 5, 8 or 10 mm, for example, wherein each of the values mentioned can also represent an upper or lower limit of the range of values mentioned. The (not tapered) wall thickness of the partial casings is preferably in the range between 2 and 20 mm and amounts to 2, 3, 5, 10, 15 or 20 mm, for example, wherein each of the values mentioned can also represent an upper or lower limit of the range of values mentioned. The depth of the outer groove is preferably in the range between 1 and 10 mm and amounts to 1, 2, 3, 5 or 10 mm, for example, wherein each of the values mentioned can also represent an upper or lower limit of the range of values mentioned.

Preferably, the electronic unit is configured as a common electronic unit for the first and second motor-pump groups, as is known in principle from EP 3 764 522 A1. Correspondingly, the disclosure of EP 3 764 522 A1, in particular in view of the configuration of the electronic unit, but also in view of the arrangement of the various construction groups, the dimensions and the properties of the axle set described there or the apparatus described there and the associated advantages are incorporated in the disclosure content of the present document.

The preferably common electronic unit is electrically immediately connected with both the electric motor of the first motor-pump group and the electric motor of the second motor-pump group and is adapted to control both motor-pump groups at the same time. Advantageously, the two motor-pump groups are controlled exclusively and completely via the common electronic unit and/or powered with electric energy by it, so that the motor-pump groups do not have any further electric connectors besides the electric connection with the common electronic unit. Further, the common electronic unit or the electronic casing has exactly one actuation connector, for example for a CAN bus, which can also include a supply voltage connector, and exactly one power connector, for example for 48 V, which can also be executed as a high-voltage connector for 400 V or 800 V, for example, which are particularly preferably arranged immediately on the partial casing of the electronic unit. Correspondingly, for example only exactly one electronic unit needs to be connected per axle.

Alternatively, the electronic unit can be subdivided into two subunits for the two respective motor-pump groups, for example, which are arranged, for example, in the partial casing of the electronic unit in a manner spaced apart from each other. In this case, the electronic unit or the electronic casing can have exactly two or more actuation connectors and power connectors.

Preferably, the maximal (permanent) power of the electric motors of the two motor-pump groups further is in the range between 0.1 and 5 kW and amounts to 0.1, 0.2, 0.5, 1, 1.5, 2, 2.5, 3, 4 or 5 kW, for example, wherein each of the values mentioned can also represent an upper or lower limit of the range of values mentioned. Further, the operating pressure in the unloaded state is preferably between 5 and 25 bar, wherein peak values of over 200 bar can occur in operation. The delivery rate of the hydraulic fluid is preferably in the range between 15 and 30 l/min at pressure differences on, for example, two line connectors of a pump of the motor-pump groups up to 30 bar. In particular if the pressure differences are greater, the volume flow is also dependent on the power or construction size of the motor-pump group. With an electric motor with a power between 3 and 5 kW the volume flow typically amounts to up to 10 l/min at a pressure difference in the range between 100 and 150 bar. The rotational speeds of the electric motor and thus also of the hydraulic pump are proportional to the volume flow. The maximal rotational speeds are typically in the range between 5,000 and 10,000 rpm.

The electric motors of the two motor-pump groups are preferably formed in a four-quadrant-capable manner or as electric motor generator. This allows for an alternating or rotational operation as an electric drive and/or as an electric generator (recuperation operation), whereby, for example as a consequence of a pressure surge on the pump (for example resulting from a mechanical thrust onto a shock absorber), hydraulic energy can be recuperated via the pump from the shock absorber or the chassis system in the form of electric energy.

The first and/or second hydraulic pump is preferably an internal gear pump, since it has low inertia and high volume efficiency and thus permits a highly dynamic alternating operation with minimal hysteresis and minimal energy losses. A switching between generator and motor operation and vice versa is preferably possible with a temporal resolution of up to 50 Hz, for example, and also the control unit is formed in manner suitable for this. In particular, the motor-pump units are preferably suitable for operating together with the damper both in the range of the vehicle body frequency, usually up to 5 Hz, and in the range of the wheel frequency, usually up to 50 Hz. Internal gear pumps are known, for example, from DE 10 2014 103 958 A1 or DE 10 2014 103 959 A1, the disclosure content of which with respect to this is incorporated in the present document.

In a preferred embodiment of the apparatus or of the axle set the drive axes or longitudinal axes of both motor-pump groups and their respective motor-pump casings are disposed on a common axis forming a longitudinal axis or common longitudinal axis of the apparatus or the axle set according to the invention, which is also referred to as axial arrangement hereinafter. The pumps and possibly the pump lids are arranged respectively on sides of the respective motor-pump groups or motor-pump casings or of the axle set that face away from each other, so that the electric motors are arranged between the pumps of the motor-pump groups. Correspondingly, the apparatus according to the invention presently has an elongated construction with a total length (measured, for example, between the pump lids or between outwardly disposed front areas of the two pumps) along the common longitudinal axis in the range between 20 and 90 cm, which amounts to, for example, 20, 30, 40, 50, 60, 70, 80 or 90 cm, wherein each of the values mentioned can also form an upper or lower limit of the range of values mentioned. Such an axial arrangement minimizes the spacing between the pumps and the respective shock absorbers and thus the length of the corresponding pressure lines, which lowers the component costs and minimizes line-related, fluid-dynamic effects.

In such an axial arrangement, the electronic casing spans preferably the apparatus substantially or exactly with respect to its complete length, whereby the size of the opening in the electronic casing is maximized, ensuring easy accessibility to the electronic unit.

In an alternative, preferred embodiment, the longitudinal axes of the two motor-pump groups and their respective motor-pump casings are disposed mutually in parallel (and do not coincide) and/or the motor-pump groups have the same orientation, preferably in such a manner that the motor-pump casings of both motor-pump groups are arranged flush with each other. With this parallel orientation of the motor-pump groups the pump-side ends of the motor-pump casings of the two motor-pump groups or the respective pump lids are correspondingly disposed in a common plane, which is disposed perpendicularly to the longitudinal axes of the motor-pump groups, and the electric-motor-side ends of the partial casings of the two motor-pump groups are disposed in a further common plane, which is likewise disposed perpendicularly to the longitudinal axes of the motor-pump groups.

A chassis system according to the invention or a chassis axle for a vehicle according to the invention comprises at least a first and second hydraulically actively actuatable shock absorber with respectively two damper or pressure chambers, for example separated by a movable damper piston, which are preferably allocated to or arranged on one common chassis axle, and an apparatus, as described above, for supplying hydraulic energy in a chassis system of a vehicle (axle set), wherein the pump of the first motor-pump group hydraulically interconnects the pressure chambers of the first shock absorber and the pump of the second motor-pump group hydraulically interconnects the pressure chambers of the second shock absorber. Thereby, for example a "soft" or "hard" damping can be set, by the motor-pump group damping or throttling, for example, pressure surges from the pressure chambers to a greater or lesser degree. In this case, the respective motor-pump group is thus driven hydraulically, so that the electric motors of the motor-pump groups can be operated as electric motor generators and thus electric energy can be recuperated (recuperation). Further, also the zero position or rest position of the shock absorber can be set actively or in targeted manner and can also be changed (continually) during the driving operation (active chassis). The system in question here is preferably a closed hydraulic system in each case, in which, for example, no pressureless tank is provided. It will be understood that the chassis system can have one or several further axles, each of which can be equipped with a further apparatus according to the invention for actuating the corresponding shock absorbers.

BRIEF DESCRIPTION OF THE DRAWINGS

The invention will hereinafter be described by way of example with reference to the attached drawings. The drawings are merely schematic representations and the invention is not limited to the specific represented embodiment examples.

DETAILED DESCRIPTION

Figure 1:
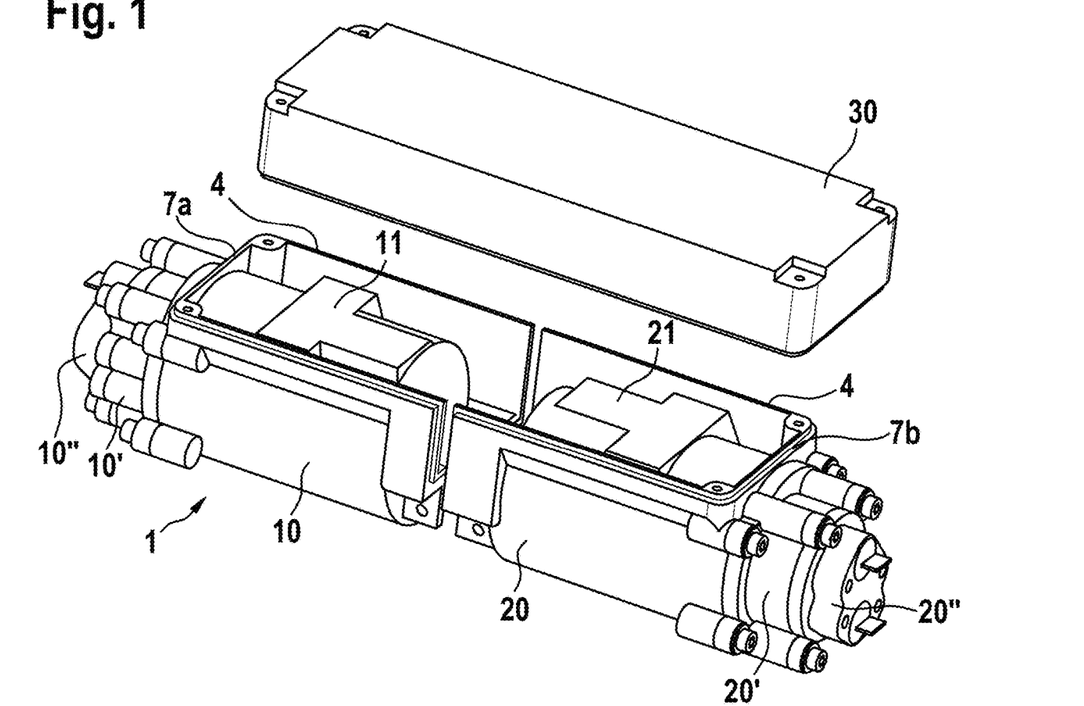
FIG. 1 shows a perspective view of a first embodiment example of an axle set according to the invention in the not yet assembled state.
Figure 2:
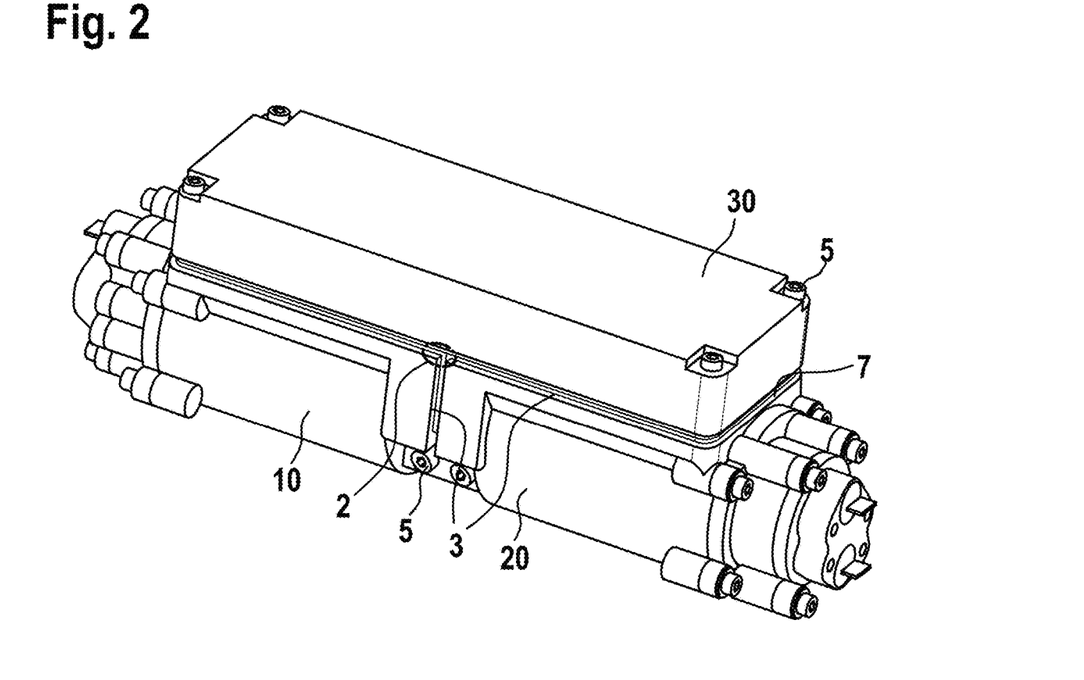
FIG. 2 shows a perspective view of the first embodiment example of an axle set according to the invention in the assembled, closed state.
Figure 3:
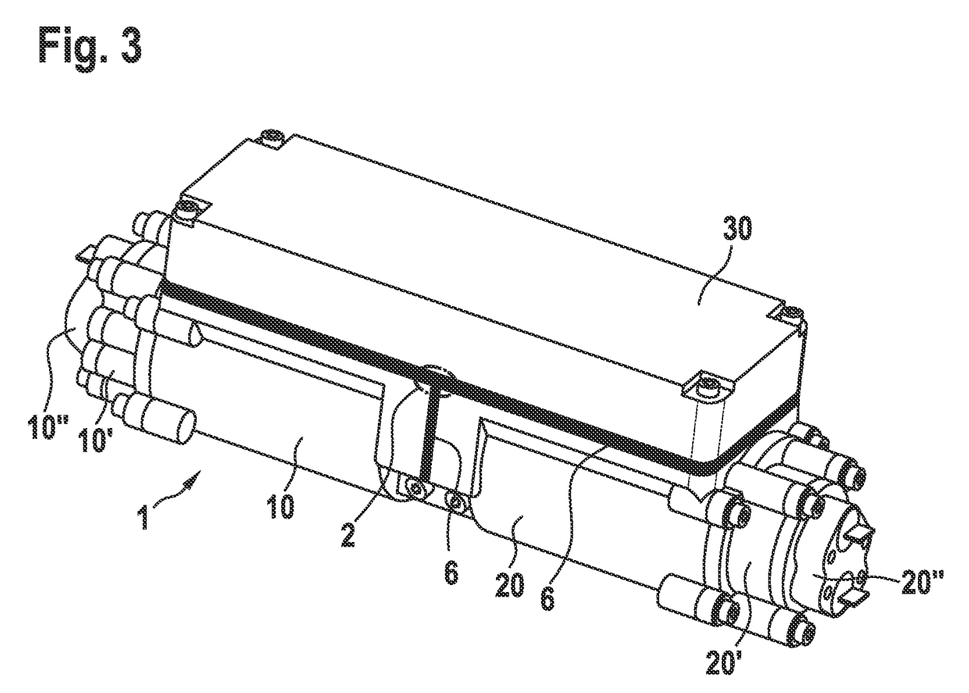
FIG. 3 shows a perspective view of the first embodiment example of an axle set according to the invention in the fully mounted, sealed state.

The FIGS. 1, 2 and 3 respectively show a perspective view of a first embodiment example of an apparatus according to the invention in the form of a substantially cuboid axle set 1, respectively in the not yet assembled state, in the assembled, closed state and in the fully mounted, sealed state. The axle set 1 consists of two motor-pump groups 11, 21 arranged in the respective casings 10, 20, and an electronic unit 31 (concealed in the figures) which is presently arranged completely in the interior space spanned by the electronic casing or the electronic lid 30. The respectively identically constructed motor-pump groups 11, 21 are arranged substantially within the interior space spanned by the respective motor-pump casing 10, 20 and are thus embedded, wherein the respectively terminally arranged pumps of the motor-pump groups 11, 21 project over the motor-pump casing 10, 20 through a planar, flat, front-side opening in said casing and are covered in sealing manner there by flange-mounted pump lids 10', 10'', 20', 20''. In the represented embodiment example the motor-pump groups 11, 21 are arranged completely within the interior space spanned by the respective motor-pump casings 10, 20 and the pump lids 10', 10'', 20', 20'' flange-mounted thereon. The motor-pump casings 10, 20 serve as carriers for the respective motor-pump group 11, 21, i.e. the motor-pump groups 11, 21 are permanently mounted or pre-mounted in the respective motor-pump casings 10, 20. The electronic lid 30 likewise serves as a carrier for the electronic unit 31, which is provided as a common electronic unit for controlling both motor-pump groups 11, 21 in the present embodiment example. The electronic lid 30 correspondingly has only exactly one actuation connector and exactly one power supply connector (which are not represented individually).

In the axle set 1 of the first embodiment example is it provided that with the two motor-pump casings 10, 20 and the electronic lid 30 exactly three partial casings respectively adjoin each other, so that in the closed overall casing (consisting of the two motor-pump casings 10, 20, the electronic lid 30 and the pump lids 10', 10'', 20', 20'') there result, presently at a branching-off point 2 in the form of a T-joint, branching-off casing separation lines 3 between the three respectively mutually adjoining partial casings 10, 20, 30. The two motor-pump casings 10, 20 and the electronic lid 30 have corresponding abutment edges 4, along which two casings abut on each other continuously in each case.

Further, at least the three respectively mutually adjoining partial casings 10, 20, 30 consist of electroconductive die-cast aluminum, so that there results a continuously electroconductive connection between the partial casings 10, 20, 30 at the mutually contacting abutment edges 4, i.e. continuously along these casing separation lines 3. Thereby, an efficient electromagnetic or EMC-conforming casing shielding of the axle set 1 is achieved. Advantageously, all partial casings 10, 10', 10'', 20, 20', 20'', 30, thus also the pump lids 10', 10'', 20', 20'', of the axle set 1 consist of electroconductive die-cast aluminum and there is a continuous, electroconductive connection between all partial casings 10, 10', 10'', 20, 20', 20'', 30.

In order to join the three respectively mutually adjoining partial casings 10, 20, 30, these are permanently interconnected via screw connections 5 (see FIG. 2). Subsequently, the casing separation lines 3 of the three respectively mutually adjoining partial casings 10, 20, 30 are continuously adhesively bonded by machine with a sealing adhesive, in that a sealing adhesive 6 is applied from the outside to the now mutually abutting abutment edges 4. Along the mutually abutting abutment edges 4 of the three respectively mutually adjoining partial casings 10, 20, 30, along the circumference in each case, a reduced wall thickness of the partial casings 10, 20, 30 is provided, so that in the assembled, closed state of the axle set 1 or of the overall casing there results an outer groove 7, including recesses 7a and 7b, in which the sealing adhesive 6 is introduced.

Presently, employing a sealing adhesive 6 (and also providing the abutment edges 4) and also providing branching-off points like in the present T-joints 2, permits greater degrees of freedom with respect to the configuration of the partial casings 10, 20, 30 and of the resulting casing separation lines 3. Presently, the abutment edges 4 of the two motor-pump casings 10, 20 (at the casing separation lines 3 of the three respectively mutually adjoining partial casings 10, 20, 30) are disposed in exactly two planes disposed perpendicularly to each other, which correspondingly form the openings towards the interior space of the axle set 1. The two motor-pump groups 11, 21 therefore do not have to be accommodated in an integral, dish-shaped casing, for example, but—prior to joining—can be pre-mounted independently in two separate carrier casings 10, 20. Correspondingly, there results a good accessibility also to the electric motors disposed mutually opposite in the mounted axle set 1 of the respective motor-pump groups 11, 21, which are arranged respectively on sides of the motor-pump groups 11, 21 facing away from the pump.

Figure 4:
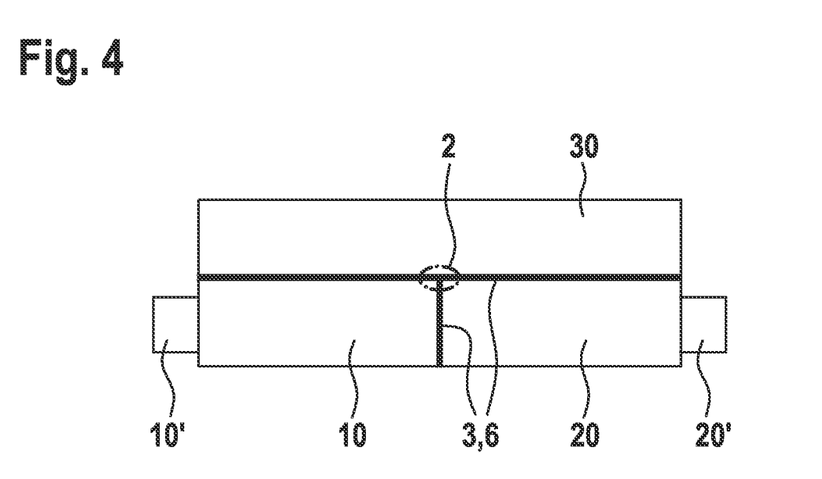
FIG. 4 shows a schematic view of the first embodiment example.

In the first embodiment example represented in the FIGS. 1 to 3, the two motor-pump groups 11, 21 are arranged on a common longitudinal axis. This means that the respective, not represented, inwardly disposed drive shafts mechanically connecting the electric motors with the pumps in the motor-pump groups 11, 21 and defining the longitudinal axis of the respective motor-pump group 11, 21, are disposed on a common axis. This is represented schematically again in FIG. 4. In FIG. 4 also the housing separation lines 4 between the motor-pump casings 10, 20 and the electronic lid 30, which are closed with the sealing adhesive 6, are indicated by bold lines. Likewise, the pump lids 10', 10'', 20', 20'' provided in each case on the motor-pump casings 10, 20 are represented only schematically as respectively one pump lid 10', 20'.

Figure 5:
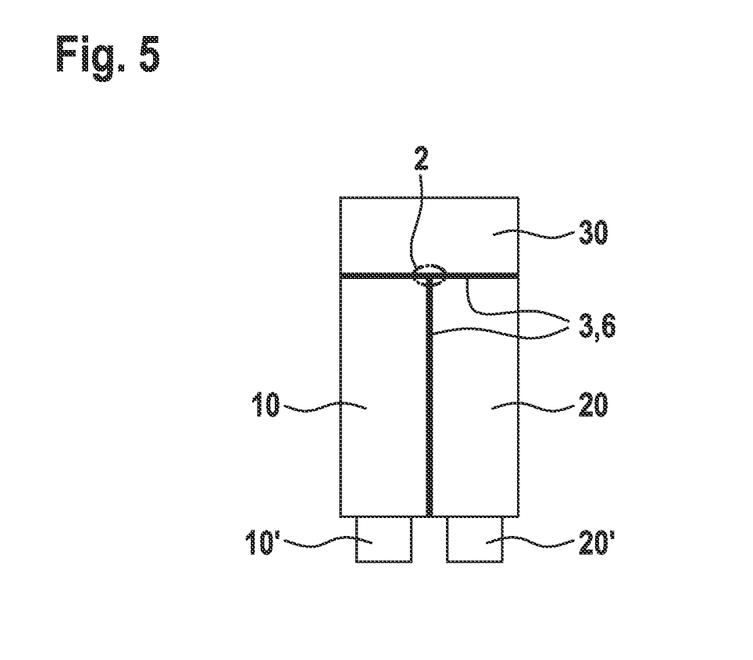
FIG. 5 shows a schematic view of a second embodiment example.

In contrast, it is provided in a second embodiment example that the motor-pump groups 11, 21 are arranged with longitudinal axes respectively disposed in parallel, as schematically represented in FIG. 5. The pumps or pump lids 10', 20' of the respective motor-pump group 11, 21 are arranged in the respective motor-pump casings 10, 20 on the same side of the axle set 1 that continues to be substantially cuboid. In contrast, an electronic lid 30 covers the sides of the motor-pump casings 10, 20 or the electric motors that are disposed next to one another and face away from the pump. Correspondingly—like also in the first embodiment example—there result casing separation lines 3 branching off at a T-joint 2, which are again indicated in FIG. 5 by increased line widths. This results in an improved accessibility to the electric motors of the motor-pump groups 11, 21 mounted in the respective motor-pump casings 10, 20.

Figure 6:
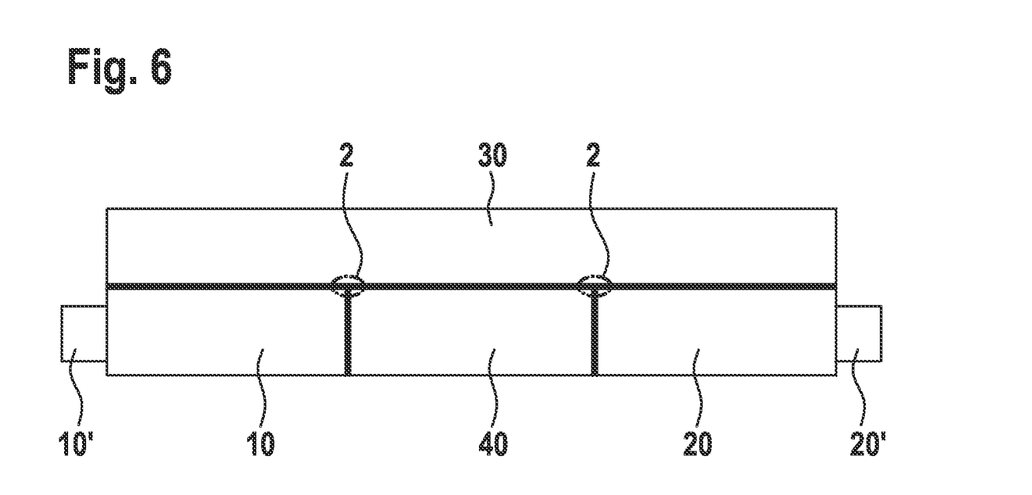
FIG. 6 shows a schematic view of a third embodiment example.

In FIG. 6 a third embodiment example of the axle set 1 is represented schematically. In contrast to the first embodiment example, not only three, but exactly four partial casings 10, 20, 30, 40 are arranged in respectively mutually adjoining manner, wherein the casing separation lines 3 resulting therefrom are again closed with a sealing adhesive 6. In the third embodiment example—in contrast to the first and the second embodiment example—there are not only two T-joints or branching-off points 2, but four. Correspondingly, for example the spacing between the two motor-pump groups 11, 21 or between the respective motor-pump casings 10, 20 can be increased by a further partial casing 40 (or possibly a multiplicity of further partial casings) and thus, for example, the construction space on the inside of the axle set 1 can be increased.

Figure 7:
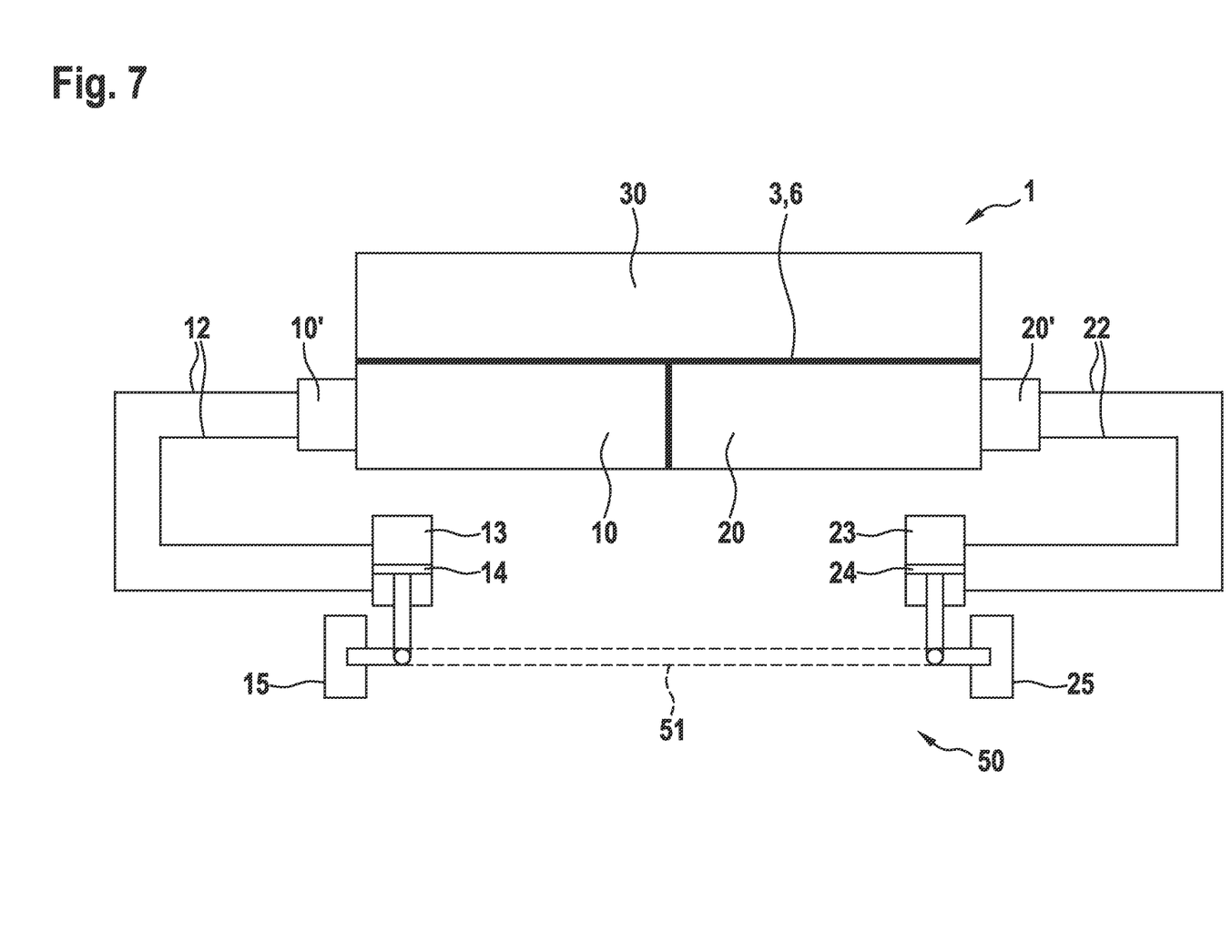
FIG. 7 shows a schematic view of a chassis system with an axle set according to the invention, according to the first embodiment example.

In FIG. 7 a chassis system 50 with an axle set 1 according to the invention, according to the first embodiment example, is represented schematically. The respectively two hydraulic lines 14, 24 extending from the pumps of the motor-pump groups 11, 21 in each case are connected with the two pressure chambers of respectively one shock absorber 13, 23, said pressure chambers in the simplest case being separated by a piston 14, 24 that can travel axially in a damper cylinder. In the represented embodiment example the cylinders of the shock absorbers 13, 23 are connected with the suspended mass of the vehicle or the chassis, while the pistons 14, 24 are connected or coupled with the unsuspended mass of the vehicle or respectively one wheel 15, 25 and possibly, if present, also with a chassis axle 51. However, this can also be configured the other way around. Further, in the schematic representation of FIG. 7 usually additionally provided suspension elements, for example an air suspension element and/or a steel suspension element, have been omitted.

LIST OF REFERENCE NUMERALS 1 axle set, apparatus
2 branching-off point, T-joint
3 casing separation line
4 abutment edge
5 screw connections
6 sealing adhesive
7 outer groove
10, 20 motor-pump casing
10', 10'', 20', 20'' pump lid
11, 21 motor-pump group
12, 22 hydraulic lines
13, 23 shock absorber
14, 24 piston
15, 25 wheel
30 electronic lid
31 electronic unit
40 further partial casing
50 chassis system
51 chassis axle

The invention claimed is:

1. An apparatus for supplying hydraulic energy in a chassis system of a vehicle, comprising:
a first motor-pump group, comprising a first hydraulic pump and a first electric motor configured to drive the first hydraulic pump;
a second motor-pump group, comprising a second hydraulic pump and a second electric motor configured to drive the second hydraulic pump; and
an electronic unit configured to control the first motor-pump group and the second motor-pump group, wherein the electronic unit, the first motor-pump group, and the second motor-pump group are arranged in an overall casing that is constructed of three partial casings, the three partial casings respectively mutually adjoin each other at corresponding engagement regions such that the three partial casings immediately adjoin each other in at least one point on the overall casing and a sealing adhesive closes the three partial casings along casing separation lines between the three partial casings, and along or on one or more casing separation lines on the exterior side of the overall casing, a depression or a outer groove is provided for receiving the sealing adhesive and is formed by recesses in the engagement regions that each have half the width of the resulting outer groove on the overall casing.

2. The apparatus according to claim 1, wherein the overall casing has a cuboid outer area, the casing separation lines do not extend along edges of the overall casing, and edges of the overall casing intersect exclusively at an angle that is substantially perpendicular.

3. The apparatus according to claim 1, wherein the three partial casings have respectively corresponding engagement regions, abutment edges, mutually engage along casing separation lines of the overall casing, abut on each other, and form a boundary of the three partial casings.

4. The apparatus according to claim 1, wherein all engagement regions or abutment edges of the three partial casings are disposed in exactly three planes, which intersect and are disposed perpendicularly to each other.

5. The apparatus according to claim 1, wherein the three partial casings have a closed, integral or single-piece outer area or exterior side, are electroconductive, and comprise cast aluminum or consist thereof.

6. The apparatus of claim 5, wherein there is a continuously electroconductive connection between the three partial casings.

7. The apparatus according to claim 1, wherein the first motor-pump group is arranged in a first partial casing of the three partial casings and includes a longitudinal axis of the first motor-pump group and of the first partial casing, the first partial casing has a U-shaped cross section and continuously surrounds the first motor-pump group on at least three sides, and engagement regions of the first partial housing extend in exactly two planes that are disposed perpendicularly to each other, the second motor-pump group is arranged in a second partial casing of the three partial casings, includes a longitudinal axis of the second motor-pump group and of the second partial casing, the second partial casing has a U-shaped cross section and continuously surrounds the second motor-pump group on at least three sides, and engagement regions of the second partial housing extend in exactly two planes that are disposed perpendicularly to each other.

8. The apparatus according to claim 1, wherein the electronic unit is arranged in a third partial casing of the three partial casings, which spans a cuboid space and has a U-shaped cross section.

9. The apparatus according to claim 1, wherein the electronic unit is a common electronic unit for both motor-pump groups.

10. The apparatus according to claim 1, wherein the maximum power of the electric motors of the first motor-pump group and the second motor-pump group is respectively in the range between 0.1 and 5 kW, the electric motors of the first motor-pump group and the second motor-pump group are formed in a four-quadrant-capable manner and as an electric motor generator, and the pumps of the first motor-pump group and the second motor-pump group are formed as internal gear pumps.

11. The apparatus according to claim 1, wherein the longitudinal axes of both motor-pump groups of the three partial casings are disposed on a common axis, which forms a longitudinal axis of the apparatus, the pumps of both motor-pump groups respectively face away from each other, and the apparatus has a total length in the range between 20 and 90 centimeters.

12. The apparatus according to claim 1, wherein the longitudinal axes of both motor-pump groups of the three partial casings are disposed mutually in parallel and both motor-pump groups have the same orientation, the three partial casings of both motor-pump groups are arranged flush, and the partial casing of the electronic unit is arranged on a side of the partial housings of the motor-pump groups that faces away from the respective pump.

13. A chassis axle comprising the apparatus according to claim 1, wherein the chassis axle is pre-mounted and has two actuatable shock absorbers which are hydraulically connected with the pumps of the motor-pump groups.

14. A chassis system for a vehicle, comprising a first shock absorber and a second shock absorber which are allocated to a common chassis axle or arranged on the common chassis axle, and the apparatus according to claim 1, wherein the first motor-pump group hydraulically connects pressure chambers of the first shock absorber and the second motor-pump group hydraulically connects pressure chambers of the second shock absorber and the apparatus is arranged on the common chassis axle.

15. The apparatus of claim 1, further comprising:
screw connections between the three partial casings.

16. The apparatus of claim 1, further comprising:
an outer groove configured to receive the sealing adhesive is provided continuously along the casing separation lines of the three partial casings.

17. The apparatus of claim 16, wherein a width of the outer groove is between 1 mm and 10 mm.

18. The apparatus of claim 16, wherein a depth of the outer groove is between 1 mm and 10 mm.

19. The apparatus of claim 1, further comprising:
a fourth partial casing, wherein the fourth partial casing mutually adjoins the three partial casings.

20. The apparatus of claim 1, wherein the engagement regions are formed as distal abutment edges and/or wherein the respectively mutually adjoining partial casings do not overlap.

* * * * *